United States Patent
Buford et al.

(10) Patent No.: US 8,589,024 B2
(45) Date of Patent: Nov. 19, 2013

(54) THERMAL CONDITIONING OF RECHARGEABLE ENERGY STORAGE SYSTEMS OF VEHICLES

(75) Inventors: Keith D. Buford, Southfield, MI (US); Matthew Simonini, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 39 days.

(21) Appl. No.: 13/277,138

(22) Filed: Oct. 19, 2011

(65) Prior Publication Data

US 2012/0136535 A1   May 31, 2012

Related U.S. Application Data

(60) Provisional application No. 61/417,681, filed on Nov. 29, 2010.

(51) Int. Cl.
  *G06F 7/00* (2006.01)
(52) U.S. Cl.
  USPC .............................................. 701/36; 701/22
(58) Field of Classification Search
  USPC ........................................ 701/22, 36; 429/56
  See application file for complete search history.

(56) References Cited

U.S. PATENT DOCUMENTS

| | | | |
|---|---|---|---|
| 7,975,757 B2* | 7/2011 | Nemesh et al. | 165/42 |
| 8,049,359 B2* | 11/2011 | Kinser et al. | 307/9.1 |
| 2009/0001183 A1* | 1/2009 | Kilian et al. | 237/5 |
| 2010/0100345 A1* | 4/2010 | Katrak et al. | 702/65 |
| 2012/0082871 A1* | 4/2012 | Simonini et al. | 429/50 |
| 2012/0109433 A1* | 5/2012 | Simonini | 701/22 |
| 2012/0109617 A1* | 5/2012 | Minarcin et al. | 703/14 |
| 2012/0316712 A1* | 12/2012 | Simonini et al. | 701/22 |

OTHER PUBLICATIONS

Nelson, R.F. Power Requirements for Batteries in Hybrid Electric Vehicles, Journal of Power Sources, vol. 91, No. 1, Nov. 2000, pp. 2-26.*
Meissner, E. Battery Monitoring and Electrical Energy Management Precondition for Future Vehicle Electric Power Systems, Journal of Power Sources, vol. 116, Nos. 1-2, Jul. 2003, pp. 79-98.*
U.S. Appl. No. 12/894,553, filed Sep. 30, 2010.
U.S. Appl. No. 13/156,255, filed Jun. 8, 2011.

* cited by examiner

*Primary Examiner* — Russell Frejd
(74) *Attorney, Agent, or Firm* — Ingrassia Fisher & Lorenz, P.C.

(57) ABSTRACT

Methods, systems, and vehicles are provided that provide for thermal conditioning of a vehicle rechargeable energy storage system (RESS). A thermal conditioning system is coupled to the RESS, and is configured to thermally condition the RESS. A control system is coupled to the thermal conditioning system, and is configured to estimate an amount of time after which a temperature of the RESS will be outside a predetermined range and provide instructions to the thermal conditioning system to thermally condition the RESS after the amount of time.

20 Claims, 5 Drawing Sheets

THERMAL CONDITIONING OF RECHARGEABLE ENERGY STORAGE SYSTEMS OF VEHICLES

PRIORITY CLAIM

This application claims priority from U.S. Provisional Patent Application Ser. No. 61/417,681 filed on Nov. 29, 2010, the entirety of which is incorporated by reference herein.

TECHNICAL FIELD

The present disclosure generally relates to the field of vehicles and, more specifically, to methods and systems for thermal conditioning of rechargeable energy storage systems of vehicles.

BACKGROUND

Certain vehicles, particularly electric vehicles and hybrid electric vehicles, have rechargeable energy storage systems (RESS), such as batteries. It is generally desired to maintain a temperature of the RESS within certain limits. The RESS temperature may be maintained by continuously monitoring the voltage and current values associated with the RESS. However, this type of monitoring may require greater than optimal usage of energy and/or other vehicle resources.

Accordingly, it is desirable to provide improved methods for thermal conditioning of vehicle RESS, in a manner that may help to conserve energy and/or vehicle resources. It is also desirable to provide improved systems for such thermal conditioning of vehicle RESS, and for vehicles that include such methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for thermally conditioning a rechargeable energy storage system (RESS) of a vehicle. The method comprises the steps of estimating an amount of time after which a temperature of the RESS will be outside a predetermined range, and thermally conditioning the RESS after the amount of time.

In accordance with another exemplary embodiment, a control system is provided for thermally conditioning a rechargeable energy storage system (RESS) of a vehicle. The control system comprises a thermal conditioning system and a controller. The thermal conditioning system is configured to thermally condition the RESS. The controller is coupled to the thermal conditioning system, and is configured to estimate an amount of time after which a temperature of the RESS will be outside a predetermined range, and to provide instructions to the thermal conditioning system to thermally condition the RESS after the amount of time.

In accordance with a further exemplary embodiment, a vehicle is provided. The vehicle comprises a drive system, a thermal conditioning system, and a control system. The drive system includes a rechargeable energy storage system (RESS). The thermal conditioning system is coupled to the RESS, and is configured to thermally condition the RESS. The control system is coupled to the thermal conditioning system, and is configured to estimate an amount of time after which a temperature of the RESS will be outside a predetermined range, and to provide instructions to the thermal conditioning system to thermally condition the RESS after the amount of time.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
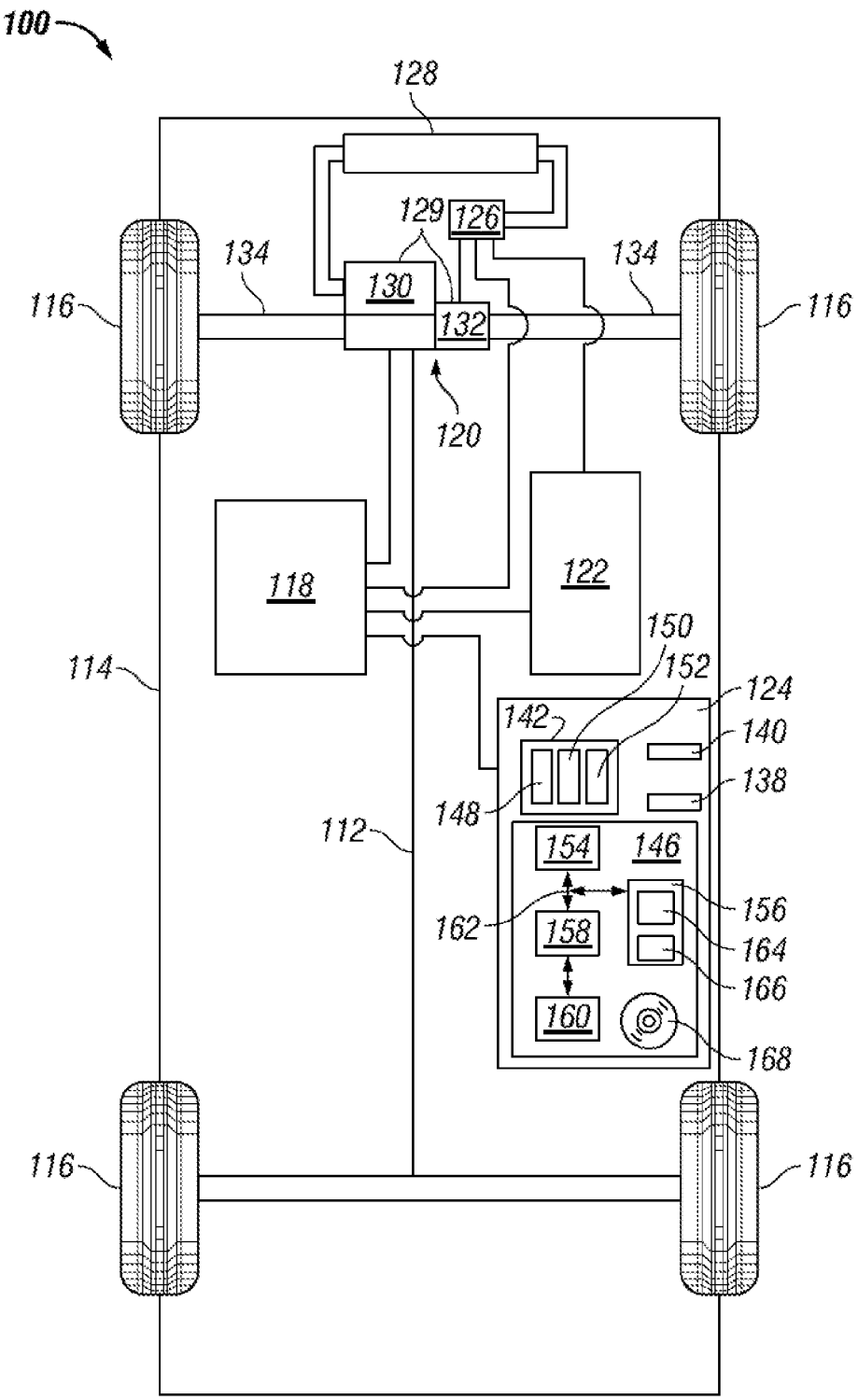
FIG. 1 is a functional block diagram of a vehicle that includes a rechargeable energy storage system (RESS) and a control system for thermally conditioning the RESS, in accordance with an exemplary embodiment.

FIG. 1 illustrates a vehicle 100, or automobile, according to an exemplary embodiment. As described in greater detail further below, the vehicle 100 is configured to thermally condition a rechargeable energy storage system (RESS) of a the vehicle 100 based on an estimation of when a temperature of the RESS is likely to reach a value that is outside a desired RESS temperature range, based on a current RESS temperature and an ambient temperature outside the RESS.

The vehicle 100 includes a chassis 112, a body 114, four wheels 116, and an electronic control system 118. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, the above-referenced RESS 122, an RESS control system 124, a power inverter assembly (or inverter) 126, and a radiator 128. The actuator assembly 120 includes at least one propulsion system 129 mounted on the chassis 112 that drives the wheels 116.

Specifically, as depicted in FIG. 1, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The RESS 122 is electrically connected to the inverter 126. In one embodiment, the RESS 122 is mounted on the chassis 112. In one such embodiment, the RESS 122 is disposed within a cockpit of the vehicle. In another embodiment, the RESS 122 is disposed underneath a cockpit of the vehicle. The RESS 122 preferably comprises a rechargeable battery having a pack of battery cells. In one embodiment, the RESS 122 comprises a lithium iron phosphate battery, such as a nanophosphate lithium ion battery. Together the RESS 122 and the propulsion system 129 provide a drive system to propel the vehicle 100. The RESS 122 is thermally conditioned by the RESS control system 124, as described in detail below.

As depicted in FIG. 1, the RESS control system 124 includes a thermal conditioning system 138, a clock 140, a sensor array 142, and one or more controllers 146. In addition, although not illustrated as such, the RESS control system 124 (and/or one or more components thereof) may be integral with the electronic control system 118 and may also include one or more power sources. In certain embodiments, the controller(s) 146 may comprise multiple controllers and/or systems working together. For the sake of brevity, such controllers and/or systems are referenced collectively herein as the controller 146.

The clock 140 maintains a current time of day, and may also maintain related information (such as a current date and year). In one embodiment, the clock 140 is part of the controller 146. In another embodiment, the clock 140 is part of a separate controller or system. In certain embodiments, the clock 140 receives information as to the time of day from a network or other source, such as via a communications bus of the vehicle and/or via a wireless network, for example from a cellular communication network and/or a satellite communication network. The clock 140 supplies information pertaining to the time of day for use by the controller 146 in setting an alarm for triggering or initiating thermally conditioning the RESS 122.

The sensor array 142 includes one or more ambient temperature sensors 148, one or more RESS temperature sensors 150, and one or more thermal conditioning system sensors 152, among other various possible sensors. The ambient temperature sensors 148 are preferably disposed proximate but outside the RESS 122. The ambient temperature sensors 148 measure an ambient temperature outside (and preferably adjacent to) the RESS 122. The ambient temperature sensors 148 provide signals and/or information pertaining to the measurements to the controller 146 for processing and for use in determining when to thermally condition the RESS 122.

The RESS sensors 150 are preferably disposed inside the RESS 122. The RESS sensors 150 measure a temperature of the RESS 122, most preferably a temperature inside the RESS. The RESS sensors 150 provide signals and/or information pertaining to the measurements to the controller 146 for processing and for use in thermally conditioning the RESS 122.

The thermal conditioning system sensors 152 are preferably disposed within or proximate to the thermal conditioning system 138. The thermal conditioning system sensors 152 measure one or more values for use by the thermal conditioning system 138 (such as a temperature within the thermal conditioning system 138 or of a coolant fluid thereof, by way of example) for thermally conditioning the RESS 122 based on instructions provided by the controller 146.

The controller 146 is coupled to the clock 140, the sensor array 142, the RESS 122, and the electronic control system 118. The controller 146 utilizes the data and information from the clock 140 (including the time of day) and the measured values from the sensor array 142 (including the ambient temperature and the RESS temperature) in estimating an amount of time that is expected to elapse before the RESS temperature is outside a predetermined desirable (normal operating) range for the RESS, and uses this estimated amount of time to set an alarm for thermally conditioning the RESS 122. The thermal conditioning for the RESS 122 is provided when the RESS temperature is outside the normal operating range in order to help to optimize performance and longevity of the RESS 122, because an RESS temperature outside of the normal range may have an adverse effect on RESS performance and longevity. The controller 146, and/or other controllers and/or other devices, enter a sleep or inactive mode after the alarm is set until the alarm is triggered. While in the sleep mode, the controller 146, and/or other controllers and/or other devices, have at least some of their functions (and preferably most of their functions) in an inactive or off state, so as to conserve energy and vehicle resources. Once the alarm is triggered (for example, as determined based on the amount of elapsed time as ascertained via the clock 140), an updated (or current) temperature of the RESS 122 is measured, and the RESS 122 is thermally conditioned by the thermal conditioning system 138 based on instructions provided by the controller 146 if the current RESS temperature is outside of the predetermined desirable range. These and other steps are preferably performed in accordance with the process 400 described further below in connection with FIGS. 4 and 5.

As depicted in FIG. 1, the controller 146 comprises a computer system. In certain embodiments, the controller 146 may also include one or more of the sensors 148, 150, 152, the clock 140, the electronic control system 118 and/or portions thereof, and/or one or more other devices. In addition, it will be appreciated that the controller 146 may otherwise differ from the embodiment depicted in FIG. 1. For example, the controller 146 may be coupled to or may otherwise utilize one or more remote computer systems and/or other control systems.

In the depicted embodiment, the computer system of the controller 146 includes a processor 154, a memory 156, an interface 158, a storage device 160, and a bus 162. The processor 154 performs the computation and control functions of the controller 146, and may comprise any type of processor or multiple processors, single integrated circuits such as a microprocessor, or any suitable number of integrated circuit devices and/or circuit boards working in cooperation to accomplish the functions of a processing unit. During operation, the processor 154 executes one or more programs 164 contained within the memory 156 and, as such, controls the general operation of the controller 146 and the computer system of the controller 146, preferably in executing the steps of the processes described herein, such as the steps of the process 400 described further below in connection with FIGS. 4 and 5.

The memory 156 can be any type of suitable memory. This would include the various types of dynamic random access memory (DRAM) such as SDRAM, the various types of static RAM (SRAM), and the various types of non-volatile memory (PROM, EPROM, and flash). The bus 162 serves to transmit programs, data, status and other information or signals between the various components of the computer system of the controller 146. In a preferred embodiment, the memory 156 stores the above-referenced program 164 along with one or more stored values 166 for use in thermal conditioning of the RESS 122. In certain examples, the memory 156 is located on and/or co-located on the same computer chip as the processor 154.

The interface 158 allows communication to the computer system of the controller 146, for example from a system driver and/or another computer system, and can be implemented using any suitable method and apparatus. It can include one or more network interfaces to communicate with other systems or components. The interface 158 may also include one or more network interfaces to communicate with technicians, and/or one or more storage interfaces to connect to storage apparatuses, such as the storage device 160.

The storage device 160 can be any suitable type of storage apparatus, including direct access storage devices such as hard disk drives, flash systems, floppy disk drives and optical disk drives. In one exemplary embodiment, the storage device 160 comprises a program product from which memory 156 can receive a program 164 that executes one or more embodiments of one or more processes of the present disclosure, such as the steps of the process 400 of FIGS. 4 and 5, described further below. In another exemplary embodiment, the program product may be directly stored in and/or otherwise accessed by the memory 156 and/or a disk (e.g., disk 168), such as that referenced below.

The bus 162 can be any suitable physical or logical means of connecting computer systems and components. This includes, but is not limited to, direct hard-wired connections, fiber optics, infrared and wireless bus technologies. During operation, the program 164 is stored in the memory 156 and executed by the processor 154.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 154) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 146 may also otherwise differ from the embodiment depicted in FIG. 1, for example in that the computer system of the controller 146 may be coupled to or may otherwise utilize one or more remote computer systems and/or other control systems.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the combustion engine 130 and the inverter 126.

The thermal conditioning system 138 thermally conditions the RESS 122. Specifically, the thermal conditioning system 138 utilizes heating and cooling techniques, as appropriate, for heating or cooling the RESS 122, based on instructions provided by the controller 146 (preferably by the processor 154 thereof). The heating and cooling techniques are selected so as to attain the desired heating or cooling of the RESS 122 while optimizing energy efficiency.

Figure 2:
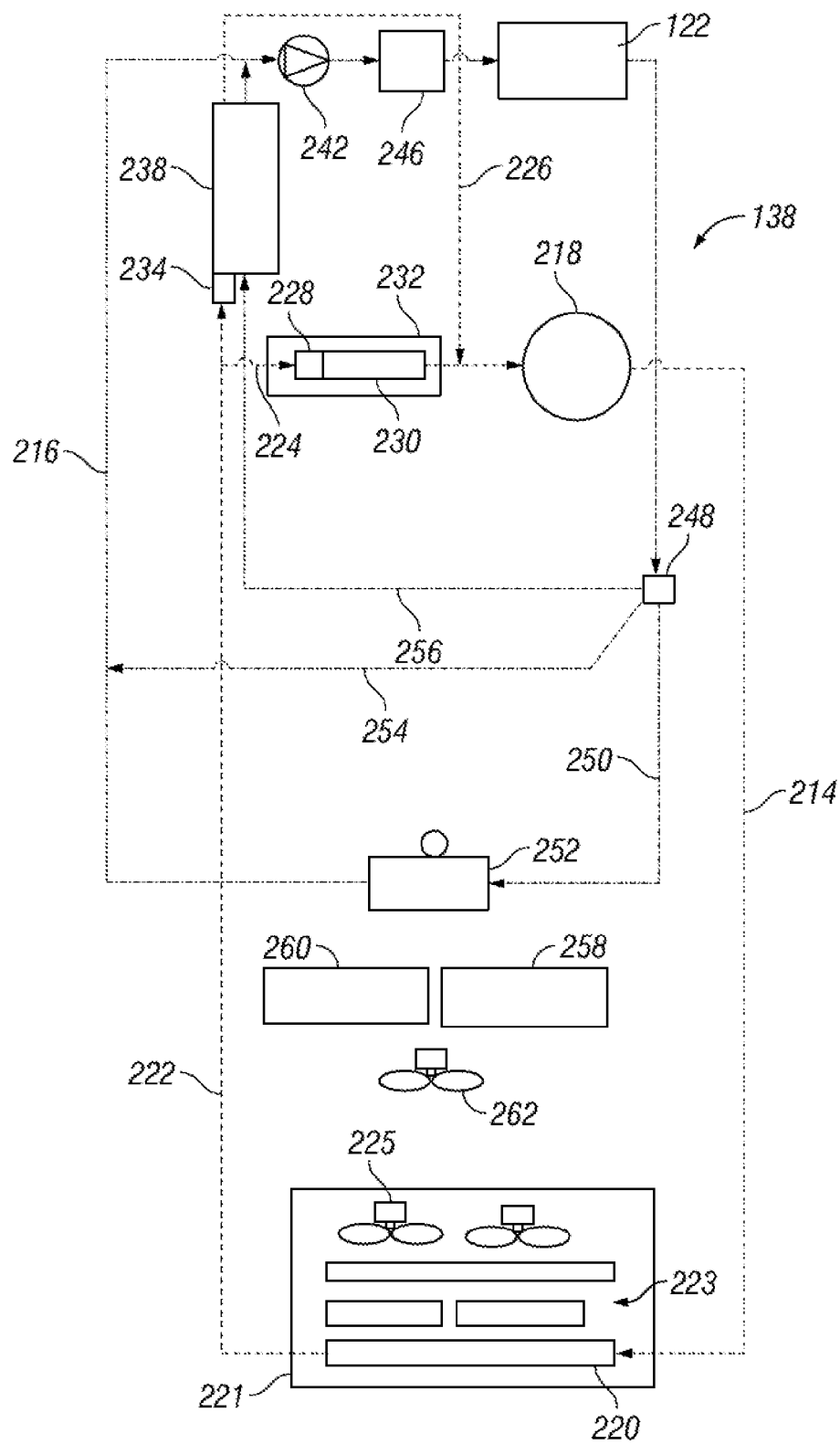
FIG. 2 is a schematic view of a thermal conditioning system of the control system of FIG. 1, in accordance with an exemplary embodiment.

With reference to FIG. 2, a schematic view is provided of the thermal conditioning system 138 of FIG. 1, in accordance with a first exemplary embodiment. As depicted in FIG. 2, the thermal conditioning system 138 includes a refrigerant loop 214 and a coolant loop 216. The thermal conditioning system 138 depicted in FIG. 2 may be used, for example, in a plug-in hybrid electric vehicle or an extended range electric vehicle.

Figure 4:
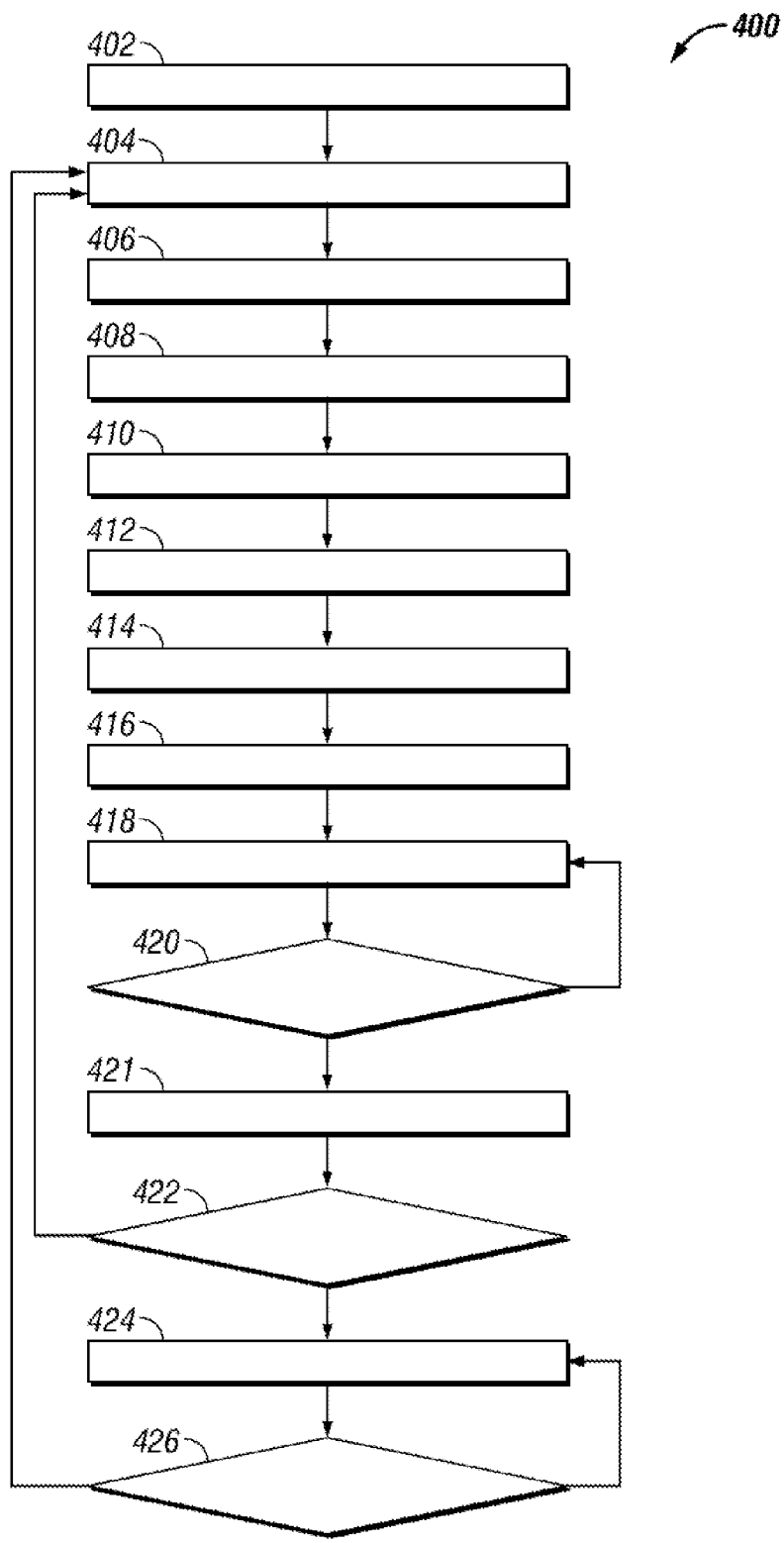
FIG. 4 is a flowchart of a process for thermally conditioning an RESS for a vehicle, and that can be used in connection with the vehicle, the RESS, and the control system of FIG. 1 (including the thermal conditioning systems of FIGS. 2 and 3), in accordance with an exemplary embodiment.
Figure 5:
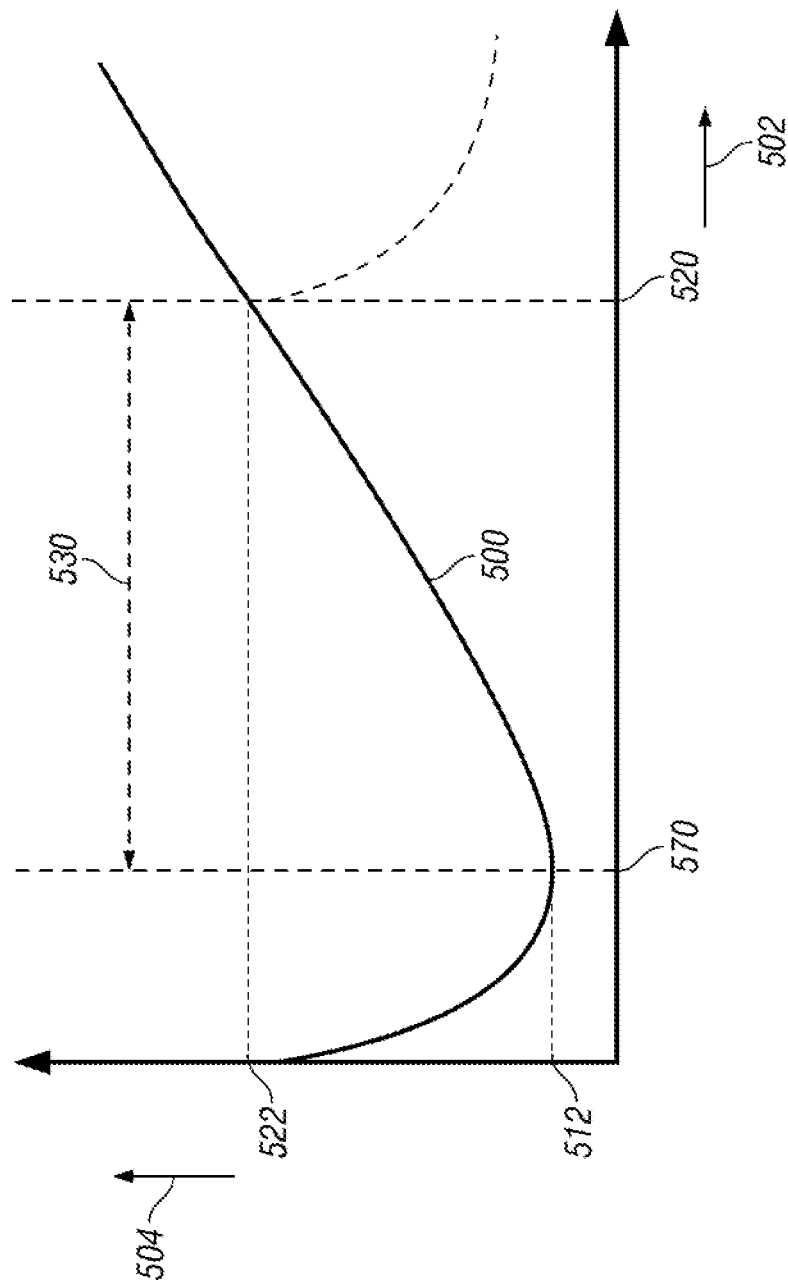
FIG. 5 is a graphical representation of certain steps of the process of FIG. 4, in accordance with an exemplary embodiment.

Each of the components of the thermal conditioning system 138 are preferably controlled directly or indirectly via instructions provided by the controller 146 of FIG. 1, most preferably by the processor 154 thereof Specifically, the thermal conditioning system 138 thermally conditions the RESS 122 of FIG. 1 based on an RESS temperature, an ambient temperature, a time of day, and an estimation of an amount of time after which the RESS temperature will be outside a predetermined desirable range, based on instructions provided by the controller 146 of FIG. 1, and in accordance with the process 400 described below in connection with FIGS. 4 and 5.

As depicted in FIG. 2, the thermal conditioning system 138 includes a refrigerant loop 214 and a coolant loop 216. The refrigerant loop 214 includes a refrigerant compressor 218 and a condenser 220. In certain examples, the refrigerant loop 214 and the refrigerant compressor 218 may be part of a condenser, radiator, fan module (CRFM) 221. The CRFM 221 may include other heat exchangers 223 and fans 225 used to heat or cool fluids from other vehicle systems as well as from the RESS 122 of FIG. 1. In a preferred embodiment, the refrigerant compressor 218 is electrically driven, and is capable of adjusting the speed of the compressor during operation.

The condenser 220 directs refrigerant into a refrigerant line 222 that splits into a heat, ventilation, and air conditioning (HVAC) leg 224 and a chiller leg 226 of the refrigerant loop 214. The HVAC leg 224 directs the refrigerant through an expansion device 228 and into an evaporator 230, which is located in an HVAC module 232. In some embodiments, refrigerant exiting the evaporator 230 may be directed back to the refrigerant compressor 218 through an accumulator (not shown).

The chiller leg 226 directs the refrigerant through an expansion device 234 and then through a chiller 238. The chiller 238 preferably comprises a refrigerant-to-coolant heat exchanger. Refrigerant exiting the chiller 238 is directed back to the refrigerant compressor 218 via chiller leg 226.

The chiller 238 is also in fluid communication with the coolant loop 216. The dashed lines in FIG. 2 (and, similarly, in FIG. 3, described further below) represent lines through which refrigerant flows. The dash-dot lines represent lines through which a coolant liquid flows. The coolant liquid may be a conventional liquid mixture such as an ethylene glycol and water mix, or may be some other type of liquid with suitable heat transfer characteristics.

As depicted in FIG. 2, the coolant loop 216 includes a coolant pump 242 that pumps the coolant through the coolant loop 216. The coolant pump 242 is controllable to vary the flow rate of the coolant flowing through the coolant loop 216. The coolant loop 216 also includes the RESS 122 of FIG. 1, and an electric coolant heater 246. The coolant flowing through the RESS 122 is used to cool or warm the RESS as needed. The electric coolant heater 246 can be activated to heat the coolant flowing through it in order to provide warming to the RESS 122.

A four port coolant routing valve 248 is located in the coolant loop 216. The routing valve 248 can be selectively actuated to direct the coolant through three different branches of the coolant loop 216. A first branch 250 includes an RESS radiator 252, which is positioned to have air flowing through it. The RESS radiator 252 may be mounted near an accessory power module 258 and an RESS charger 260, which have air directed through them by a controllable fan 262. A second branch 254 forms a coolant bypass line where the coolant does not flow through the RESS radiator 252 or the chiller 238. A third branch 256 directs the coolant through the chiller 238. All three branches join together to direct the coolant back through the RESS 122.

Figure 3:
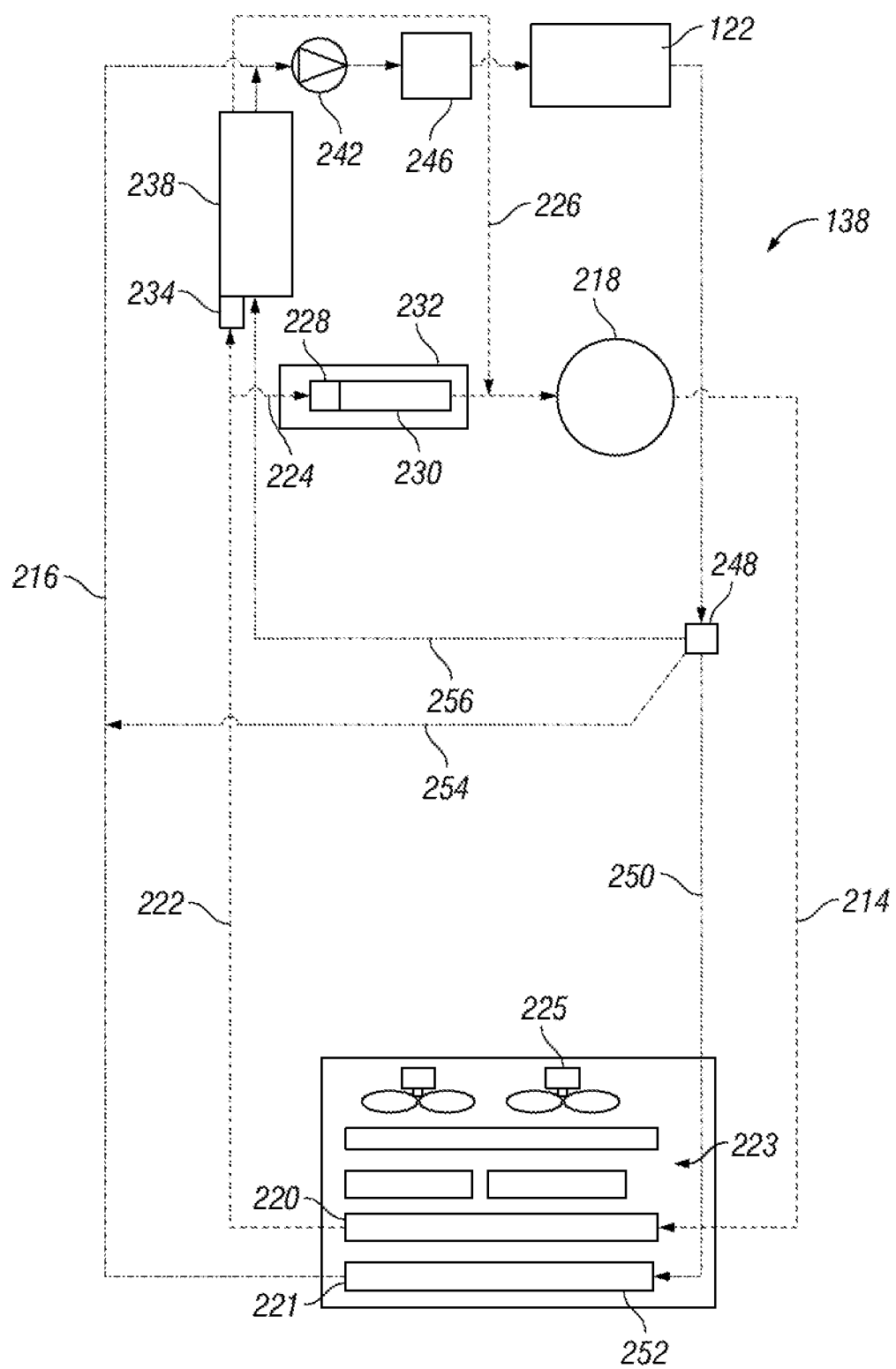
FIG. 3 is a schematic view of a thermal conditioning system of the control system of FIG. 1, in accordance with an alternate exemplary embodiment.

FIG. 3 illustrates another example of the thermal conditioning system 138, in accordance with a second exemplary embodiment. The embodiment of FIG. 3 may be used, for example, in connection with an extended range electric vehicle. Because the embodiment of FIG. 3 is similar to that of FIG. 2, similar element numbers will be used for similar elements, which also have similar functions as those described above in connection with FIG. 2. In the embodiment of FIG. 3, the RESS radiator 252 may be part of the CRFM 221. While the two embodiments of FIGS. 2 and 3 may have somewhat different configurations, the processes, discussed below, for cooling and warming the RESS 122 may be essentially the same, if so desired.

Similar to the embodiment of FIG. 2, in FIG. 3 each of the components of the thermal conditioning system 138 are similarly preferably controlled directly or indirectly via instructions provided by the controller 146 of FIG. 1, most preferably by the processor 154 thereof Specifically, the thermal conditioning system 138 thermally conditions the RESS 122 of FIG. 1 based on an RESS temperature, an ambient temperature, a time of day, and an estimation of an amount of time after which the RESS temperature will be outside a predetermined desirable (normal operating) range for the RESS, based on instructions provided by the controller 146 of FIG. 1, and in accordance with the process 400 described below in connection with FIGS. 4 and 5.

FIG. 4 is a flowchart of a process 400 for thermally conditioning an RESS for a vehicle, in accordance with an exemplary embodiment. The process 400 thermally conditions a rechargeable energy storage system (RESS) of a vehicle based on an estimation of when a temperature of the RESS is likely to reach a value that is outside a desired RESS temperature range, based on a current RESS temperature and an ambient temperature outside the RESS. The process 400 can be utilized in connection with the vehicle 100, the RESS 122, and the RESS control system 124 of FIG. 1, including the thermal conditioning system 138 embodiments of FIGS. 2 and 3.

As depicted in FIG. 4, the process 400 begins once a qualifying event occurs for the vehicle (step 402). In one embodiment, the process begins once the vehicle is powered off In another embodiment, the process begins once the RESS is finished charging, for example if the RESS is plugged into an electrical outlet for charging. In yet another embodiment, the process starts when a current period of thermal conditioning of the RESS is completed. The occurrence of such a qualifying event is preferably determined by the controller 146 of FIG. 1, most preferably by the processor 154 thereof, for starting the process.

An RESS temperature is obtained (step 404). The RESS temperature preferably comprises a temperature inside the RESS 122 of FIG. 1. The RESS temperature is preferably measured by one or more RESS sensors 150 of FIG. 1 and provided to the controller 146 of FIG. 1, and most preferably to the processor 154 thereof, for processing.

An ambient temperature is also obtained (step 406). The ambient temperature preferably comprises a temperature outside and adjacent to the RESS 122 of FIG. 1. The ambient temperature is preferably measured by one or more ambient temperature sensors 148 of FIG. 1 and provided to the controller 146 of FIG. 1, and most preferably to the processor 154 thereof, for processing.

A time of day is also obtained (step 408). The time of day preferably comprises an hour and minute value associated with the current time (such as 12:00 pm, by way of example). The time of day is preferably measured or obtained by the clock 140 of FIG. 1 and provided to the controller 146 of FIG. 1, and most preferably to the processor 154 thereof, for processing.

In addition, threshold temperature values are obtained (step 410). The threshold temperature values preferably pertain to a desired range of temperature values for the RESS. The RESS operates most efficiently, and/or has a longer life expectancy, when operated within the desired range of temperatures. In one embodiment, the desired range of temperatures is between twenty five degrees Celsius (25° C.) and thirty two degrees Celsius (32° C.), inclusive. In another exemplary embodiment, the threshold temperature value pertains to a maximum desired temperature value for the RESS within this range, for example thirty two degrees Celsius (32° C.). The threshold temperature values are preferably stored in the memory 156 of FIG. 1 as stored values 166 thereof, and are preferably retrieved by the memory 156 from the processor 154 of FIG. 1 during step 410.

A look-up table is also obtained (step 412). The look-up table represents a relationship between the current temperature of the RESS, the ambient temperature, and the amount of time after which the RESS temperature is expected to be outside a predetermined desirable range (preferably, the range of values of step 410). The look-up table may be previously generated, for example, prior to manufacturing the vehicle, by soaking various types of RESS under various temperature conditions and charting the temperature changes of the various types of RESS in response to these temperature conditions. The look-up table is preferably stored in the memory 156 of FIG. 1 as stored values 166 thereof, and is preferably retrieved by the memory 156 from the processor 154 of FIG. 1 during step 412.

An estimation is performed as to an amount of time after which the RESS temperature is expected to be outside a predetermined desirable range (step 414). This amount of time is preferably estimated based on all of the information and values obtained in steps 402-412. Specifically, the estimated amount of time is determined based on a current temperature inside the RESS (from step 404), the ambient temperature (from step 406), and the time of day (from step 408). Based on this information, the controller 146 of FIG. 1 (preferably, the processor 154 thereof) estimates the amount of time after which the RESS temperature is likely to be outside the range of values of step 410 (or in some embodiments, the amount of time after which the RESS temperature is likely to be above a predetermined temperature threshold of step 410).

In a preferred embodiment, the processor 154 utilizes the current (or most recent) temperature inside the RESS (from step 404), the ambient temperature (from step 406), and the time of day (from step 408), along with the look-up table of step 412 in estimating this amount of time. In a preferred example in which the process 400 is concerned particularly with temperature increases for the RESS, the amount of time is generally positively correlated with the current RESS temperature and the ambient temperature, and is also further adjusted based on the time of day.

For example, on a hot day in which the ambient temperature well exceeds a maximum temperature of the desired temperature range for the RESS, the estimated amount of time may decrease (as compared with cooler ambient temperatures), as the RESS may be expected to heat up relatively quickly. The estimated amount of time may likewise decrease if the RESS temperature is relatively close to the maximum threshold temperature for the desirable temperature range, as it would not take long in that situation for the RESS temperature to increase above the maximum desirable threshold temperature. The estimated amount of time may decrease further, based on a time of day adjustment factor, if the time of day represents a time that is relatively early in the day. For example, if the time of day is 10:00 am, then the estimated amount of time in this example may decrease further, as the ambient temperature is likely to increase further throughout the day (thereby exhibiting relatively greater upward movement of the RESS temperature). On the other hand, if the time of day is already late in the afternoon or in the evening (for example, 5:00 pm), then the estimated amount of time in this example may increase, as the ambient temperature is likely to decrease throughout the evening (thereby exhibiting relatively lesser upward movement of the RESS temperature).

An alarm is set (step 416). Specifically, the alarm is set for the amount of time estimated in step 414, so that the alarm is triggered once this amount of time has elapsed. The alarm is preferably set by the processor 154 of FIG. 1 using the clock 140 of FIG. 1. Also in a preferred embodiment, the alarm comprises part of the clock 140.

Once the alarm is set, one or more controllers and/or vehicle systems are set to a sleep, or inactive, mode (step 418). This setting is preferably initiated by the processor 154 of FIG. 1. While in the sleep mode, the controllers and/or systems perform fewer functions and/or tasks as compared to when such controllers and/or systems are in an active, or awake, state. In a preferred embodiment, the controller 146 of FIG. 1 is set to a sleep mode after the alarm is set. While in the sleep mode, the controller 146 is inactive with respect to many of its functions (for example, the controller 146 does not need to monitor RESS voltage, current, or temperature, as the controller 146 may ordinarily be required to do), but the controller 146 still preferably performs certain functions (such as monitoring the status of the alarm, and/or being ready to receive notification and awaken when the alarm is triggered). In certain embodiments, other controllers and/or systems may similarly be set to sleep, or inactive, modes, during this time.

A determination is made as to whether the alarm is triggered (step 420). In one embodiment, the processor 154 of FIG. 1 continuously monitors the alarm, and the processor 154 determines when the alarm is triggered. In another embodiment, the alarm is monitored from another controller or device, and is used to awaken the processor 154 from its sleep mode when the alarm is triggered. In yet another embodiment, the clock 140 of FIG. 1 provides a notification to the processor 154 when the alarm is triggered.

Once the alarm is triggered, an updated (or new current) RESS temperature is measured (step 421). The updated RESS temperature is preferably measured by the RESS sensor 150 of FIG. 1 and provided to the processor 154 of FIG. 1 for processing.

A determination is then made as to whether the updated RESS is outside a predetermined desirable range (step 422). In one embodiment, a determination is made as to whether the updated RESS temperature of step 421 is outside a predetermined range of temperature values of step 410 (for example, between twenty five degrees Celsius (25° C.) and thirty-two degrees Celsius (32° C.)). In another embodiment, a determination is made as to whether the updated RESS temperature of step 421 is greater than a predetermined maximum desirable temperature value of step 410 (for example, thirty two degrees Celsius (32° C.)).

If it is determined in step 422 that the updated RESS temperature is within a predetermined desirable range (or less than or equal to a predetermined threshold value), then the RESS is not conditioned, and the process instead re-starts, beginning with step 404. The alarm is then re-set in a subsequent iteration of step 416 for an updated estimated amount of time using updated values of the RESS temperature, the ambient temperature, and the time of day.

Conversely, if it is determined in step 422 that the current RESS temperature is outside a predetermined desirable range (or greater than a predetermined threshold value), then the RESS is thermally conditioned (step 424). In one embodiment, the RESS is conditioned in accordance with a thermal conditioning strategy (such as by, way of example only, a fan speed, a pump speed, a flow rate for a coolant fluid, a measure of heat exchanger operation, one or more other actions described above in connection with the thermal conditioning systems 138 of FIGS. 1-3, and/or one or more other actions that may affect the heating or cooling provided by the thermal conditioning system 138 of FIGS. 1-3) that are designed to cause an adjustment of the temperature inside the RESS to reach a new temperature value that is within a desirable temperature range (such as, by way of example only, a range between twenty five degrees Celsius (25° C.) and thirty two degrees Celsius (32° C.)).

The thermal conditioning strategy is preferably implemented by the thermal conditioning system 138 of FIGS. 1-3 based on instruction provided thereto by the processor 154 of FIG. 1. In one preferred embodiment, the thermal control strategy utilizes corresponding steps from or similar to those described in connection with co-pending, commonly assigned U.S. patent application Ser. No. 12/894,553, entitled Thermal Management Controls for a Vehicle Having a Rechargeable Energy Storage System and/or co-pending, commonly assigned U.S. patent application Ser. No. 13/156,255, entitled Thermal Conditioning of Vehicle Rechargeable Energy Storage Systems, both of which are incorporated by reference herein.

A determination is then made as to whether the thermal conditioning of the RESS is complete (step 426). This determination is preferably made by the processor 154 of FIG. 1 based on information provided by the thermal conditioning system sensors 152 of FIG. 1 (such as a temperature of coolant fluid), and/or from direct RESS temperature measurements made by the RESS sensors 150 of FIG. 1 (such as a direct, new, updated measure of the RESS temperature). In one embodiment, the thermal conditioning is deemed to be complete when the RESS temperature is at least a certain number of degrees within the predetermined desirable range (for example, less than thirty degrees Celsius (30° C.)). If it is determined that the RESS conditioning is not yet complete, then the RESS thermal conditioning of step 424 continues. Once it is determined that the RESS thermal conditioning is complete, the process re-starts, beginning with step 404.

With reference to FIG. 5, a graphical representation is provided illustrating an implementation of certain steps of the process 400 of FIG. 4, in accordance with an exemplary embodiment. Specifically, FIG. 5 depicts an RESS temperature 500 inside an RESS (such as the RESS 122 of FIG. 1). The x-axis 502 represents time, and the y-axis 504 represents RESS temperature.

At time 510 along the x-axis 502, a qualifying event occurs (corresponding to step 402 of FIG. 4). As described above, the qualifying event may be deemed to occur, by way of example, when the vehicle is powered off, when the RESS is finished charging, and/or when a thermal conditioning of the RESS is completed. At this time, a current (or most recent) RESS temperature 512 (corresponding to step 404 of FIG. 4) is utilized, along with an ambient temperature (corresponding to step 406 of FIG. 4) and preferably a time of day (corresponding to step 408 of FIG. 4), in order to calculate an amount of time 530 (corresponding step 414 of FIG. 4) after which the RESS temperature is expected to be reach a temperature threshold 522 that is outside a predetermined range of desirable temperature values (corresponding to step 410 of FIG. 4).

During the time period corresponding to the amount of time 530, the alarm is set, and the controller is in a sleep mode (corresponding to steps 416 and 418 of FIG. 4). Once the amount of time 530 has elapsed and the present time is equal to time 520 on the x-axis 502, the alarm is triggered (corresponding to step 420 of FIG. 4). The RESS is then thermally conditioned (corresponding to step 424 of FIG. 4), provided that a determination (corresponding to step 422 of FIG. 4) is made at time 520 that the most current RESS temperature (corresponding to step 421 of FIG. 4) is outside the predetermined range of desirable temperature values.

Accordingly, methods, systems, and vehicles are provided for thermal conditioning of a vehicle RESS. The disclosed methods, systems, and vehicles provide thermal conditioning of RESS based on an estimated amount of time that it is expected to take for a temperature of the RESS to be outside a desirable range of temperature values. This allows the controller (and/or other controllers, systems, and/or devices) to be in a sleep, or relatively inactive, mode, until this amount of time has elapsed. This is in turn allows for energy and/or other vehicle resources to be conserved, and can also improve the performance and/or lifespan of the controller and/or other vehicle components. The estimated amount of time is preferably determined based on a current (or most recent) temperature of the RESS, along with an ambient temperature and time of day.

It will be appreciated that the disclosed methods, systems, and vehicles may vary from those depicted in the Figures and described herein. For example, the vehicle 100, the RESS control system 124, the thermal conditioning system 138, and/or various components thereof may vary from that depicted in FIGS. 1-3 and described in connection therewith. In addition, it will be appreciated that certain steps of the process 400 may vary from those depicted in FIGS. 4 and 5 and/or described above in connection therewith. It will similarly be appreciated that certain steps of the process described above may occur simultaneously or in a different order than that depicted in FIGS. 4 and 5 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for thermally conditioning a rechargeable energy storage system (RESS) of a vehicle, the method comprising the steps of:
    estimating an amount of time after which a temperature of the RESS will be outside a predetermined range using a processor; and
    thermally conditioning the RESS after the amount of time.

2. The method of claim 1, wherein the step of estimating the amount of time comprises the step of:
    estimating the amount of time, the amount of time comprising a time after which the temperature of the RESS is expected to be greater than a predetermined value.

3. The method of claim 1, further comprising the step of:
    setting a timer based on the amount of time;
    causing a controller to be in a sleep mode until the amount of time has elapsed, as indicated by the timer, wherein the step of thermally conditioning the RESS is provided in accordance with instructions provided by the controller after the amount of time has elapsed.

4. The method of claim 1, wherein the step of estimating the amount of time comprises the steps of:
    measuring a current temperature of the RESS;
    measuring an ambient temperature surrounding the RESS; and
    estimating the amount of time using the current temperature of the RESS and the ambient temperature.

5. The method of claim 4, wherein the step of estimating the amount of time comprises the step of:
    retrieving a look-up table from memory, the look-up table representing a relationship between the current temperature of the RESS, the ambient temperature, and the amount of time, wherein the amount of time is estimated using the current temperature of the RESS, the ambient temperature, and the look-up table.

6. The method of claim 4, wherein the step of estimating the amount of time further comprises the steps of:
    determining a time of day, wherein the amount of time is estimated using the current temperature of the RESS, the ambient temperature, and the time of day.

7. The method of claim 4, further comprising the step of:
    measuring an updated temperature of the RESS after the amount of time has elapsed;

wherein the step of thermally conditioning the RESS is provided after the amount of time has elapsed only on a further condition that the updated temperature is outside the predetermined range.

8. A control system for thermally conditioning a rechargeable energy storage system (RESS) of a vehicle during a drive cycle, the control system comprising:
a thermal conditioning system configured to thermally condition the RESS; and
a controller coupled to the thermal conditioning system and configured to:
estimate an amount of time after which a temperature of the RESS will be outside a predetermined range; and
provide instructions to the thermal conditioning system to thermally condition the RESS after the amount of time.

9. The control system of claim 8, wherein the controller is further configured to estimate the amount of time based on an estimation of when the temperature of the RESS will be greater than a predetermined value.

10. The control system of claim 8, wherein the controller is further configured to be in a sleep mode until the amount of time has elapsed, as determined by a timer that is set based on the amount of time.

11. The control system of claim 8, wherein the controller comprises:
a first sensor configured to measure a current temperature of the RESS;
a second sensor configured to measure an ambient temperature surrounding the RESS; and
a processor coupled to the first sensor and the second sensor and configured to estimate the amount of time using the current temperature of the RESS and the ambient temperature.

12. The control system of claim 11, wherein:
the controller further comprises a memory; and
the processor is coupled to the memory and configured to:
retrieve a look-up table from the memory, the look-up table representing a relationship between the current temperature of the RESS, the ambient temperature, and the amount of time; and
estimate the amount of time using the current temperature of the RESS, the ambient temperature, and the look-up table.

13. The control system of claim 11, wherein the processor is further configured to:
determine a time of day; and
estimate the amount of time using the current temperature of the RESS, the ambient temperature, and the time of day.

14. The control system of claim 11, wherein:
the first sensor is further configured to measure an updated temperature of the RESS after the amount of time has elapsed; and
the processor is further configured to provide the instructions to the thermal conditioning system to thermally condition the RESS after the amount of time has elapsed only on a further condition that the updated temperature is outside the predetermined range.

15. A vehicle comprising:
a drive system including a rechargeable energy storage system (RESS);
a thermal conditioning system coupled to the RESS and configured to thermally condition the RESS; and
a control system coupled to the thermal conditioning system and configured to:
estimate an amount of time after which a temperature of the RESS will be outside a predetermined range; and
provide instructions to the thermal conditioning system to thermally condition the RESS after the amount of time.

16. The vehicle of claim 15, wherein the control system is further configured to estimate the amount of time based on an estimation of when the temperature of the RESS will be greater than a predetermined value.

17. The vehicle of claim 15, wherein the control system is further configured to be in a sleep mode until the amount of time has elapsed, as determined by a timer that is set based on the amount of time.

18. The vehicle of claim 15, wherein the control system comprises:
a first sensor configured to measure a current temperature of the RESS;
a second sensor configured to measure an ambient temperature surrounding the RESS; and
a processor coupled to the first sensor and the second sensor and configured to estimate the amount of time using the current temperature of the RESS and the ambient temperature.

19. The vehicle of claim 18, wherein the processor is further configured to:
determine a time of day; and
estimate the amount of time using the current temperature of the RESS, the ambient temperature, and the time of day.

20. The vehicle of claim 18, wherein:
the first sensor is further configured to measure an updated temperature of the RESS after the amount of time has elapsed; and
the processor is further configured to provide the instructions to the thermal conditioning system to thermally condition the RESS after the amount of time has elapsed only on a further condition that the updated temperature is outside the predetermined range.

* * * * *